April 26, 1938. O. G. PHILLIPS 2,115,121

FLUID TRANSMISSION APPARATUS

Original Filed Jan. 13, 1934 2 Sheets-Sheet 1

Inventor
Omi G. Phillips

By Lyon & Lyon
Attorneys

April 26, 1938. O. G. PHILLIPS 2,115,121
FLUID TRANSMISSION APPARATUS
Original Filed Jan. 13, 1934 2 Sheets-Sheet 2
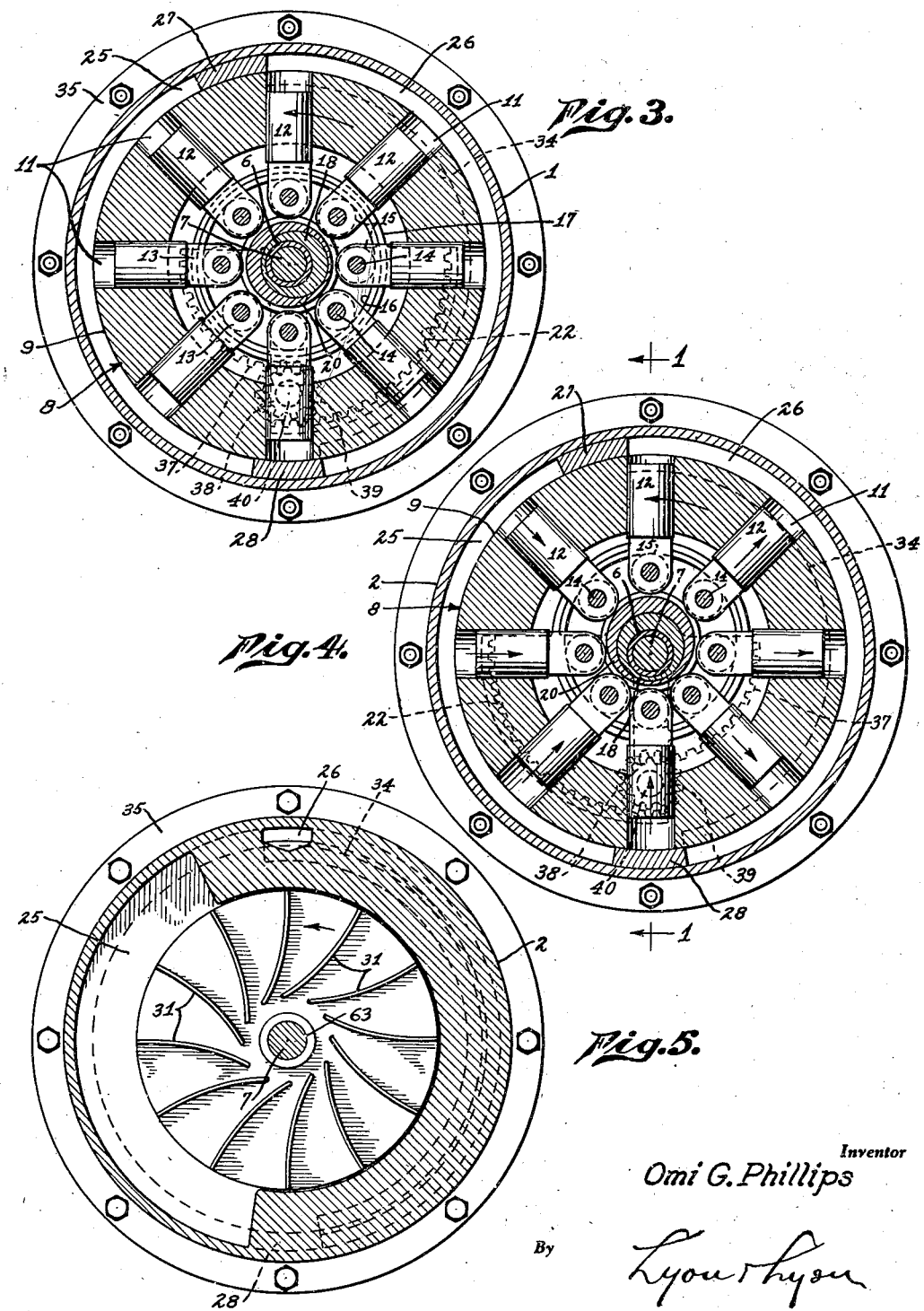
Inventor
Omi G. Phillips
By Lyon & Lyon
Attorneys Patented Apr. 26, 1938

2,115,121

UNITED STATES PATENT OFFICE 2,115,121

FLUID TRANSMISSION APPARATUS

Omi G. Phillips, Los Angeles, Calif.

Application January 13, 1934, Serial No. 706,500
Renewed March 27, 1936

15 Claims. (Cl. 103—161)

This invention relates to fluid transmission apparatus, and is capable of being employed in any connection where power is to be transmitted through the agency of a fluid or liquid under pressure. While the improvement is admirably adapted for employment to drive vehicles such as automobiles, it can be used to advantage in any situation where motors or hoists are employed, actuated by compressed air or hydraulic power. In the use of power which must be developed from time to time as wanted, it is extremely desirable to have some means of taking power from a shaft driven at a continuous speed, and one of the objects of my invention is to provide simple means to accomplish this.

A further object of the invention is to provide a fluid transmission apparatus having means for driving forward a fluid or liquid under pressure, through the medium of driving members, and to provide means for controlling these reciprocating members in such a way that their travel can be instantly varied from a minimum to a maximum amount, or vice versa.

A further object of the invention is to provide apparatus of this kind, capable of cooperating with a prime mover such as an engine, and having means whereby the fluid transmission apparatus will automatically throw the load gradually onto the engine. A further object of the invention is to provide such an apparatus with manually controlled means such as a lever controlled by a hand or one's foot, for directly controlling the stroke of the driving members and operating in such a way as to inhibit or supersede the operation of the automatic control.

A further object of the invention is to provide a compact power transmission apparatus in which I employ a plurality of cylinders with reciprocating pistons therein, arranged radially and rotatable around a common axis, and to provide improved means for insuring complete filling of the cylinders on the intake stroke of the pistons.

Further objects of the invention will appear hereinafter.

The invention consists in the novel parts and combination of parts to be described hereinafter, all of which contribute to produce an efficient fluid transmission apparatus.

In the drawings:

Figure 3 is a cross section taken on the line 3—3 of Figure 1, and particularly illustrating the rotor of the device and means for mounting and controlling the stroke of the pistons. This view shows the driving apparatus for the pistons in a neutral position so that the pistons will have no stroke whatever, when the parts have this relation.

Figure 4 is a view similar to Figure 3, but showing the parts in relation to give the maximum amount of stroke to the pistons.

Figure 5 is a cross section taken on the line 5—5 of Figure 1, and particularly illustrating means which I employ for insuring a complete filling of the cylinder bores on the intake stroke of the pistons.

Figure 1:
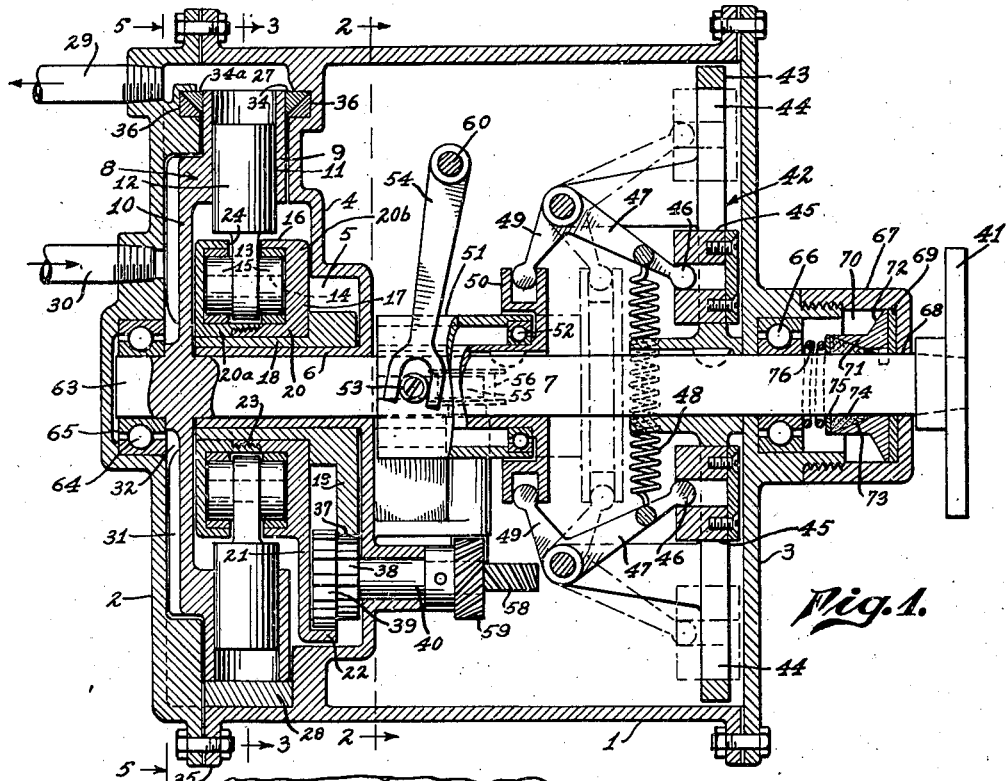
Figure 1 is a longitudinal section through apparatus embodying my invention, certain parts being shown broken away or partially in elevation. This section is taken about on the line 1—1 of Figure 4.

Before proceeding to a more detailed description of the invention, it should be stated that in practicing the invention, I provide a rotor with a plurality of substantially radially disposed cylinders in which pistons may reciprocate. As the rotor rotates, these pistons may move in and out a variable amount, which is controlled either automatically or by a lever or treadle, or both automatically and manually. The casing surrounding the rotor, carries an intake chamber into which the fluid or liquid is charged, and as the pistons are passing this chamber they are moving inwardly, thereby operating to fill the cylinders with the operating fluid or liquid. In another part of each revolution, preferably through about 180° the pistons are moving outwardly, and then the cylinders' outer ends are in communication with an outlet chamber into which the fluid or liquid is forced under pressure, and from which it flows to the motor, hoist or other apparatus, that is to be operated by the fluid or liquid. The fluid or liquid, after passing through the motor or hoist which it operates, returns to the inlet of the casing of my apparatus. In order to insure that a complete filling of the cylinders will occur in spite of the high rotary speed for the rotor, I prefer to provide means for receiving the fluid coming into the casing of the rotor, and for forcibly advancing same so as to maintain the intake chamber constantly supplied with the fluid or liquid under sufficient pressure.

In case the apparatus is to be driven by a prime mover or engine which is started up from time to time, I prefer to employ an automatically controlled device controlled by the speed of the engine, for gradually increasing the stroke of the pistons of my apparatus. In this way, the load is gradually thrown onto the engine. If the driving engine or shaft that drives my apparatus is driven at a continuous speed, I prefer to provide a hand-controlled device for increasing the stroke of the pistons at will, and if desired, such hand-control can be used in addition to an automatic speed governor, in which case, the hand-control will inhibit or supersede the governor control.

In controlling the stroke of the pistons, I prefer to employ eccentric means mounted on the shaft, and I move this eccentric means so that in a neutral position, the pistons will have no stroke, but in the fully operating position the pistons will have complete stroke.

Referring more particularly to the parts, I represents the casing of the apparatus, which preferably includes two cover plates 2 and 3. The casing has a transverse wall 4 opposite the cover plate 2, which cooperates with the cover plate to form an end chamber 5 in which the driving members such as pistons operate. This inner wall or head 4 may be formed with a tubular housing 6, which receives the shaft 7 of the apparatus.

In the present embodiment the shaft 7 is made integral with a rotor 8 of disc-form, which has a relatively thick rim 9, and the body of this rotor is in the form of a disc 10, which is offset from the plane of the thick edge 9.

In the present instance, the thick rim 9 is provided with cylinders formed by means of substantially radial bores 11 formed in the rim 9, and in these bores corresponding pistons 12 are mounted to reciprocate. The inner ends of these pistons are formed with short shanks 13 respectively, and these shanks constitute driving heads for reciprocating the pistons. For this purpose each shank is provided with a cross pin 14 carrying rollers 15 that roll inside of flanges 16 formed on a driving ring 17. Associated with this driving ring I provide eccentric means which is capable of being controlled so that in one position the stroke of the pistons will be reduced to a minimum or zero, and in the opposite position the pistons will have their maximum stroke. In order to accomplish this, I prefer to use two eccentrics, one being placed on the other. In the present instance, I provide an inner eccentric 18, the body of which is in the form of a sleeve, and one end of this eccentric carries a segment 19 for a purpose which will appear hereinafter. This eccentric sleeve has a bore that fits over the sleeve or housing 6 already described.

On the eccentric 18 I provide an outer eccentric 20 which is also in the form of a sleeve, and if desired, this eccentric sleeve 20 may constitute the inner portion or hub of the driving ring 17. This outer eccentric 20 is also provided with a segment 21 with an internally toothed flange 22, for a purpose which will appear hereinafter. The outer eccentric 20 is preferably formed in two sections 20a and 20b, which are connected together by screw threads 23. (See Fig. 1.) When these parts are fastened together, the flanges 16 cooperate to form a continuous slot 24 through which the shanks 13 of the pistons extend.

As indicated in Figure 3, the interior of the casing 1 is formed with two chambers 25 and 26 beyond the rim 9 of the rotor 8. The chamber 25 is an intake chamber and is maintained charged with the operating fluid which may be compressed air, but is preferably a liquid so as to enable the apparatus to operate as a hydraulic apparatus. The chamber 26 is an outlet chamber. These chambers are packed off from each other by means of two abutments 27 and 28. In the operation of the apparatus, the rotation is in the direction of the arrow indicated at Figure 4. As each piston passes the abutment 27 it commences to move inwardly and draws in fluid to fill the bore of the cylinder. When the piston passes the abutment 28, it commences to move outwardly and compresses the fluid or liquid into the outlet chamber 26. From the outlet chamber 26 the fluid passes through a delivery pipe 29 to the motor, hoist, or other apparatus which is to be driven.

The fluid or liquid, after passing through the motor, hoist or other apparatus, returns to the casing 1 by return pipe 30 which, in the present instance, is mounted in the cover plate or head 2. This admits the liquid to the outer face of the disc body 8 of the rotor. At this point I prefer to provide means for forcibly accelerating the liquid radially outwardly, so as to maintain the inlet chamber 25 fully charged with the operating fluid under pressure. For this purpose the adjacent face of the rotor is provided with substantially radial blades 31 which impel the operating fluid outwardly in the manner of a centrifugal pump. As indicated in Fig. 5, this inlet chamber 25 communicates with the receiving space or chamber 32, into which the inlet pipe 30 admits the operating fluid.

The chamber 25 extends circumferentially part way around the casing, being limited by a radial line drawn to the adjacent edges of the abutments 27 and 28. In other words, on one side of the diametrical vertical line passing through the shaft as illustrated in Fig. 3, the intake chamber is located, and on the other side of this diametrical line the outlet chamber 26 is located.

On each side of the heavy rim 9 of the rotor or wheel, one or more packing "rings" 34 are provided. These rings are preferably metallic packing rings of angular cross-section with 45° angle faces. A portion of the periphery of the packing "rings" is exposed to the fluid pressure as at 34a in Fig. 1, so that this packing will exert pressure on the walls of the packing groove 36 in which it is placed, and also against the sides of the rim to pack the same. In the present instance these "rings" extend only about half way around the circumference.

The casing 1 and cover 2 have peripheral flanges for attaching the cover by means of bolts.

The segment 19 has teeth 37 (see Fig. 3), and these teeth mesh with a pinion 38 which is integral with a larger pinion 39 that meshes with the toothed rim 22 of the segment 21. These pinions are carried on a shaft 40. The ratio of the diameter of each segment to its pinion is the same as the ratio of the diameter of the other segment to the diameter of its pinion, so that when the shaft 40 is adjustably rotated to alter the relation of the axes of eccentricity of the sleeves, the two sleeves will be moved through substantially the same angle but in opposite directions. Referring to Fig. 3, it will be noted that in this position the eccentricity of one sleeve counteracts the eccentricity of the other sleeve, so that in this position of the sleeves, the rotor can rotate without imparting any movement whatever, to the pistons. Figure 4, however, shows the eccentrics in the position such that each eccentric increases the total amount of eccentricity of the driving ring 17, and this relation corresponds to the maximum amount of movement that the pistons can have.

Figure 2:
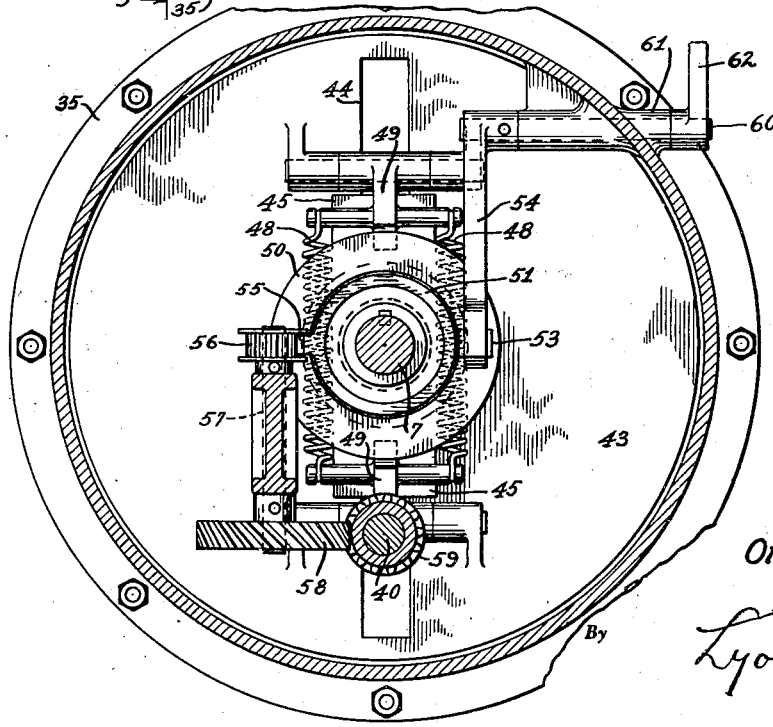
Figure 2 is a cross section taken about on the line 2—2 of Figure 1, and particularly illustrating details of the governor and details of the means for controlling the stroke of the driving members by means of this governor, or by manually actuated means. This view is partially broken away.

I provide means for controlling the shaft 40 either automatically or by hand. The automatic mechanism is desirable when the shaft 7 is to be driven by an engine or a motor that is just starting up. This prevents the entire load being thrown on the engine until it has accelerated. For example, in the present instance, a coupling flange 41 provided on the end of the shaft 7, may be connected to the gas engine on an automobile. An automatic governor 42 is controlled by the speed of the engine, and as the engine increases in speed, the stroke of the pistons will be gradually increased. In order to accomplish this, I provide the shaft 7 with a governor wheel 43, which may have two diametrically opposite radial slots 44 which act as guides for centrifugal weights 45. These weights are engaged by rounded heads 46 on bell crank levers 47 respectively, said levers being connected together by coil springs 48. (See Fig. 2.) The bell crank levers 47 have short arms 49 that engage between the flanges of a sliding collar 50 mounted to slide longitudinally on the shaft 7. This collar is in the form of a sleeve, and carries an outer sleeve 51 which is mounted on the same by means of a ball bearing 52. This permits the sleeve 51 to remain fixed against rotation, but enables it to move longitudinally with the collar 50. This outer sleeve 51 is formed with diametrically disposed pins 53, with rollers that are engaged by the fork end of an operating lever 54. The outer sleeve 50 is formed on its outer side with a longitudinally disposed rack 55 which meshes with the pinion 56 (see Fig. 2), and the spindle 57 that carries this pinion is provided with a spiral gear 58 that meshes with a spiral pinion 59 on the end of the shaft 40. In this way, the longitudinal movements of the sleeve 51 are translated into rotary movements at the shaft 40, and the amount of this movement will be proportional to the speed of the engine driving the shaft 7.

Although the governor 42 will automatically control the action of the pump pistons, it should be understood that the lever 54 enables the action of the governor to be inhibited at will. That is to say, it can be overpowered by hand-operated means. This lever 54 will be actuated manually, that is to say, through a hand lever or a pedal. In the present instance, this lever 54 is attached to a rock shaft 60 (see Fig. 2), that is mounted in the bearing 61 in the casing, the outer end of the shaft carrying a hand lever or treadle 62 that can be depressed at will. By moving this treadle 62 the sleeve 51 can be moved into any desired position regardless of the governor. In other words, it can inhibit or supersede the action of the governor.

The inner end of the shaft 7 has a stub end 63 mounted in a ball bearing 64 set in a bearing recess 65 in the cover plate 2.

The cover plate 3 has a similar ball bearing 66 for the other end of the shaft, and outside of this ball bearing a removable cap 67 is provided having an opening 68 through which the shaft 7 passes. In order to prevent oil from passing out through this opening 68, I provide an oil trap which consists of a hardened ground steel washer 69 that seats against the inner side of the cap 67. This washer is held in place by the fluid pressure that finds its way into the chamber 70 under the cap 67. In this chamber 70 a sleeve 71 is provided, having a relatively large tapered flange 72 which is subjected to the pressure of lubricating oil in the chamber 70, and this operates to hold the washer 69 tightly against the inner face of the cap. The body of the sleeve 71 has a conical bore 73 which receives a conical gland 74 of compressible material, for example, cork or similar material. The butt end of this tapered cork packing carries a washer 75, and this washer is held in place by a light coil spring 76 disposed around the shaft 7. The cork and the hardened washer 69 effectively prevent oil from passing out at this point.

In the operation of the apparatus, if the two eccentric sleeves 18 and 20 are disposed in the relation shown in Fig. 3, the driving ring 17 will have no eccentricity on the shaft 7, and consequently the rotation of this shaft will not develop any stroke whatever, in the radial pistons 12. If the governor 42 or the lever 54 is operated to shift the sleeve 51 toward the left from the position in which it is illustrated in Fig. 3, this will cause rotation of the shaft 40, thereby rotating the pinions 38 and 39, and causing rotation in the segments 19 and 21, which are carried by the inner and outer eccentric sleeves respectively. This will cause the rotation of the eccentric sleeves in opposite directions, and at the limit of this movement one sleeve will have moved through 90° in one direction, while the other sleeve will have moved through 90° in the other direction. This will align the axes of eccentricity of the sleeves in a vertical plane as indicated in Fig. 4, instead of a horizontal plane as in Fig. 3. In this position, shown in Fig. 4, the eccentricities of the two sleeves are added together, giving the maximum stroke to the pistons.

It is understood that the embodiment of the invention described herein, is only one of the many embodiments this invention may take, and I do not wish to be limited in the practice of the invention, nor in the claims, to the particular embodiment set forth.

What I claim is:

1. In a fluid transmission apparatus, the combination of a pump for pumping the fluid, having a plurality of movable driving members for developing pressure in the fluid, a driving shaft for driving the same, means for mounting said driving members to enable the travel thereof to be varied from a minimum to a maximum amount, a governor controlled by the speed of rotation of the shaft, means actuated by the governor for controlling the amount of travel of the said driving members, and manually operatable means for directly controlling the travel of the driving members by hand and operating to inhibit the control of the same by the governor.

2. In a fluid transmission apparatus, the combination of a pump for pumping the fluid, said pump having a plurality of substantially radially disposed pistons for developing pressure in the fluid, a driving shaft for the same, means for rotating the pistons on the axis of the driving shaft, means for reciprocating the pistons as they rotate on said axis, including eccentric means capable of adjustment to vary the travel of the said pistons from a minimum to a maximum, a speed-controlled governor rotating with said shaft, means connecting the governor with said eccentric means for varying the stroke of the pistons, and hand-controlled means for varying the stroke of the pistons and operating to inhibit the control of the eccentric means by the said governor.

3. In a fluid transmission apparatus, the combination of a pump for pumping the fluid, said pump having a rotor and a shaft for rotating the same, said rotor having a plurality of cylinders thereon with bores extending substantially radially from the axis of the shaft, pistons corresponding to the said cylinders and mounted to reciprocate therein, said pistons having driving heads at their inner ends, a driving ring surrounding said shaft and engaging the driving heads of the pistons to reciprocate the same, eccentric means for mounting the said driving ring on the shaft, capable of adjustment for varying the stroke of the pistons from a minimum to a maximum, and means for controlling the eccentric means.

4. In a fluid transmission apparatus, the combination of a pump for pumping the fluid, said pump having a rotor and a shaft for rotating the same, said rotor having a plurality of cylinders thereon with bores extending substantially radially from the axis of the shaft, pistons corresponding to the said cylinders and mounted to reciprocate therein, said pistons having driving heads at their inner ends, a driving ring surrounding said shaft and engaging the driving heads of the pistons to reciprocate the same, eccentric means for mounting the said driving ring on the shaft, capable of adjustment for varying the stroke of the pistons from a minimum to a maximum, a speed-controlled governor on the said shaft, a sleeve mounted to slide longitudinally of the shaft and controlled by the governor, and means for controlling the eccentric means from the said sleeve.

5. In a fluid transmission apparatus, the combination of a pump for pumping the fluid, said pump having a rotor and a shaft for rotating the same, said rotor having a plurality of cylinders thereon with bores extending substantially radially from the axis of the shaft, pistons corresponding to the said cylinders and mounted therein for reciprocation, said pistons having driving heads at their inner ends, a driving ring surrounding said shaft and engaging the driving heads of the pistons to reciprocate the same, eccentric means for mounting the said driving ring on the shaft capable of adjustment for varying the stroke of the pistons from a minimum to a maximum, a speed-controlled governor on the said shaft, a sleeve mounted to slide longitudinally of the shaft and controlled by the governor, means for controlling the eccentric means from the said sleeve, and manually controlled means connecting with the sleeve to enable the eccentric means to be manually controlled and operating to inhibit the control of the eccentric means by the said governor.

6. In a fluid transmission apparatus, the combination of a pump for pumping the fluid, said pump having a rotor and a shaft for rotating the same, said rotor having a plurality of cylinders thereon with bores extending substantially radially from the axis of the shaft, pistons corresponding to the said cylinders and mounted therein for reciprocation, said pistons having driving heads at their inner ends, a driving ring surrounding said shaft and engaging the driving heads of the pistons to reciprocate the same, an inner eccentric mounted on the shaft, an outer eccentric mounted on the inner eccentric and carrying the said driving ring, a speed-controlled governor on the said shaft, and means actuated by the governor for rotating said eccentrics to vary the stroke of the pistons from a minimum to a maximum.

7. In a fluid transmission apparatus, the combination of a pump for pumping the fluid, said pump having a rotor and a shaft for rotating the same, said rotor having a plurality of cylinders thereon with bores extending substantially radially from the axis of the shaft, pistons corresponding to the said cylinders and mounted to reciprocate therein, said pistons having driving heads at their inner ends, a driving ring surrounding said shaft and engaging the driving heads of the pistons to reciprocate the same, an inner eccentric mounted on the shaft, an outer eccentric mounted on the inner eccentric and carrying the said driving ring, a speed-controlled governor on the said shaft, and means actuated by the governor for rotating said eccentrics in different directions to vary the stroke of the pistons from a minimum to a maximum.

8. In a fluid transmission apparatus, the combination of a pump for pumping the fluid, said pump having a rotor and a shaft for rotating the same, said rotor having a plurality of cylinders thereon with bores extending substantially radially from the axis of the shaft, pistons corresponding to the said cylinders and mounted to reciprocate therein, said pistons having driving heads at their inner ends, a driving ring surrounding said shaft and engaging the driving heads of the pistons to reciprocate the same, an inner eccentric mounted on the shaft, an outer eccentric mounted on the inner eccentric and carrying the said driving ring, a speed-controlled governor on the said shaft, a segment rigid with the inner eccentric, another segment rigid with the outer eccentric, pinions corresponding to said eccentrics for rotating the same in different directions to vary the stroke of the pistons from a minimum to a maximum, and means actuated by the governor for adjustably rotating the pinions.

9. In a fluid transmission apparatus, the combination of a pump casing, a pump rotor having a driving shaft and mounted in said casing, said rotor having the form of a relatively thick disc with a plurality of cylinder bores formed therein with their axes disposed substantially radially from the axis of the shaft, means for packing the periphery of said disc on each side, said casing having an intake chamber extending circumferentially on one side of a radial line through the casing, and having an outlet chamber on the other side of said radial line, a plurality of pistons mounted in said bores, means for effecting an inward movement of the pistons while the outer ends of the bores are in communication only with the intake chamber to draw the fluid into the same and for forcing the pistons outwardly when their bores are in communication only with the said outlet chamber.

10. In a fluid transmission apparatus, the combination of a pump casing, a pump rotor having a driving shaft and mounted in said casing, said rotor having the form of a relatively thick disc with a plurality of cylinder bores formed therein with their axes disposed substantially radially from the axis of the shaft, means for packing the periphery of said disc on each side, said casing having an intake chamber extending circumferentially on one side of a radial line through the casing, and having an outlet chamber on the other side of said radial line, a plurality of pistons mounted in said bores, means for effecting an inward movement of the pistons while the outer ends of the bores are in communication only with the intake chamber to draw the fluid into the same and for forcing the pistons outwardly when their bores are in communication only with the said outlet chamber, and means for varying the stroke of the said pistons from a minimum to a maximum amount.

11. In a fluid transmission apparatus, the combination of a pump casing, a pump rotor having a driving shaft and mounted in said casing, said rotor having the form of a relatively thick disc with a plurality of cylinder bores formed therein with their axes disposed substantially radially from the axis of the shaft, means for packing the periphery of said disc on each side, said casing having an intake chamber extending circumferentially on one side of a radial line through the casing, and having an outlet chamber on the other side of said radial line, a plurality of pistons mounted in said bores, means for effecting an inward movement of the pistons while the outer ends of the bores are in communication with the intake chamber to draw the fluid into the same and for forcing the pistons outwardly when their bores are in communication with the said outlet chamber, a speed-controlled governor on said shaft, and means actuated thereby for varying the amount of stroke of the pistons from a minimum to a maximum amount.

12. In a fluid transmission apparatus, the combination of a pump casing, a pump rotor having a driving shaft and mounted in said casing, said rotor having the form of a relatively thick disc with a plurality of cylinder bores formed therein with their axes disposed substantially radially from the axis of the shaft, means for packing the periphery of said disc on each side, said casing having an intake chamber extending circumferentially on one side of a radial line through the casing, and having an outlet chamber on the other side of said radial line, a plurality of pistons mounted in said bores, means for effecting an inward movement of the pistons while the outer ends of the bores are in communication with the intake chamber to draw the fluid into the same and for forcing the pistons outwardly when their bores are in communication with the said outlet chamber, a speed-controlled governor on the said shaft, means controlled thereby for varying the stroke of the pistons from a minimum to a maximum amount, and manually operatable means for controlling the stroke of the said pistons and operating to inhibit the control of the same by the said governor.

13. In a fluid transmission apparatus, the combination of a pump casing having a receiving chamber for the fluid to be pumped, and a delivery outlet for the same, a pump rotor mounted for rotation in the casing and having a rim at its periphery with side faces, walls having packing grooves adjacent the said side faces, and metallic packing members of angular cross section mounted in the said grooves for packing off the receiving chamber from the delivery outlet exposed to the fluid pressure developed by the pump in the delivery outlet so that the fluid pressure maintains the packing members tight in their grooves and pressed against the side faces of the rotor.

14. In a fluid transmission apparatus, the combination of a pump casing, a pump rotor mounted for rotation in the casing and having a rim at its periphery with side faces, walls on the casing having packing grooves adjacent the said side faces, packing in each of said grooves, for retaining the fluid within the casing, said packing including a packing member of angular cross section with an inclined side face mounted in the grooves, and exposed to the fluid pressure within the casing so that the fluid pressure maintains the packing members tight in their grooves and pressed against the side faces of the rotor.

15. In a fluid transmission apparatus, the combination of a casing having a fluid receiving chamber and an outlet, a rotor mounted for rotation in the casing and having a side face, said casing having a packing groove adjacent said side face, packing in said groove for packing off the receiving chamber from the said outlet, said packing including a packing member of angular cross section with an inclined side face mounted in the groove, and exposed to the fluid pressure within the casing so that the fluid pressure maintains the packing member pressed against the side face of the rotor.

OMI G. PHILLIPS.